June 5, 1934. L. S. HAMER 1,961,583
PACKING
Filed Nov. 7, 1932 2 Sheets-Sheet 1
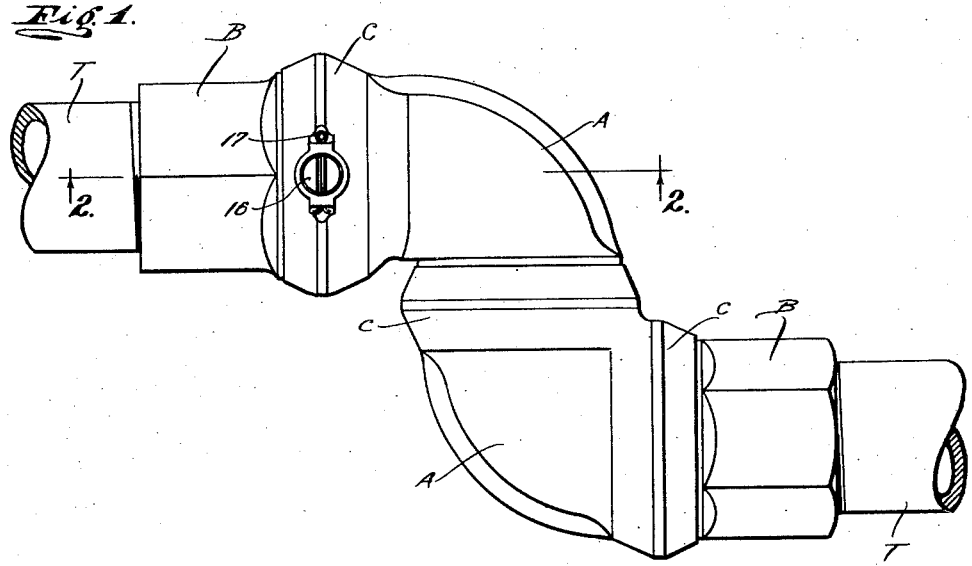
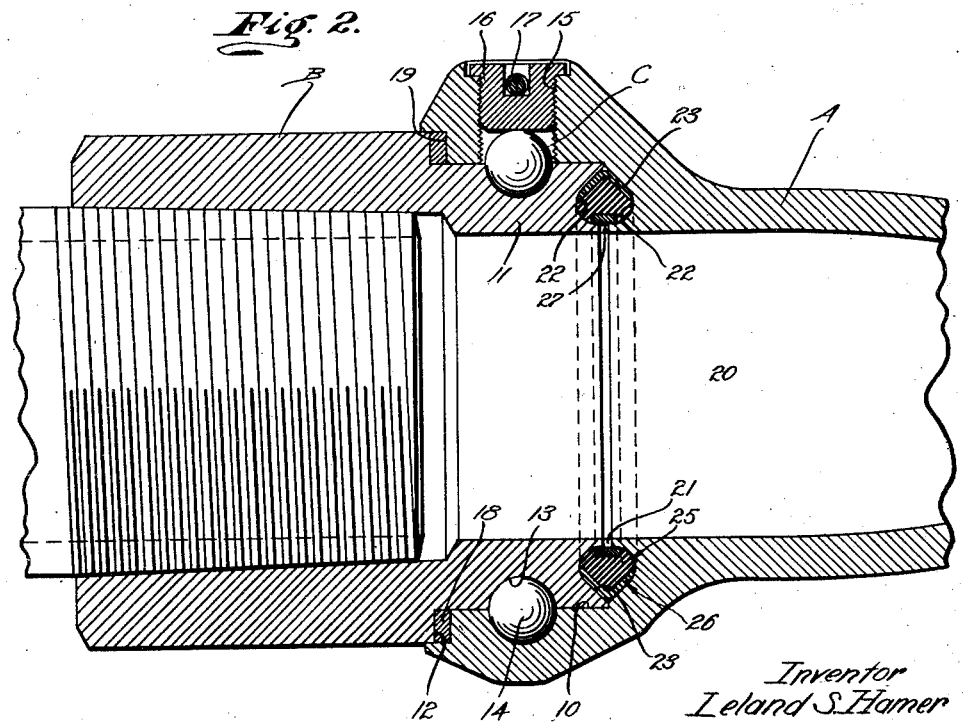
Inventor
Leland S. Hamer
By
His Attorney June 5, 1934.  L. S. HAMER  1,961,583
PACKING
Filed Nov. 7, 1932   2 Sheets-Sheet 2
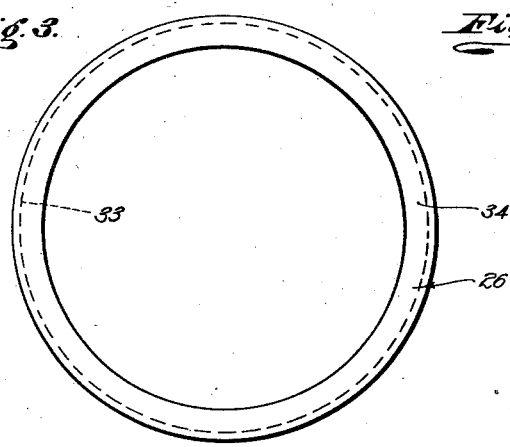
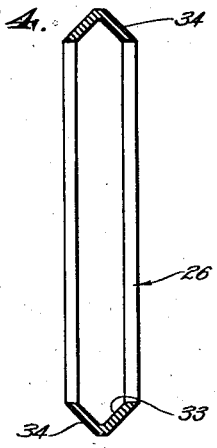
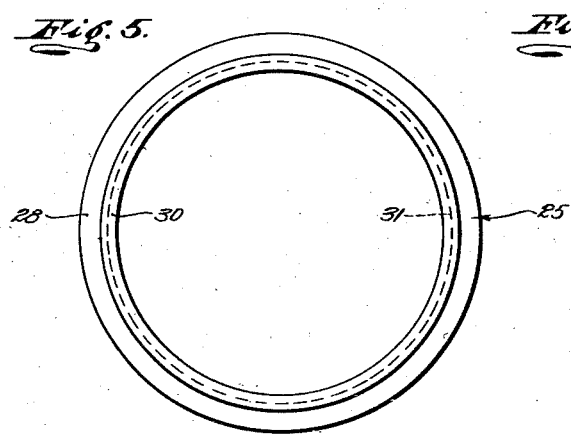
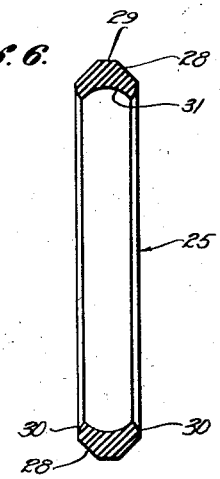
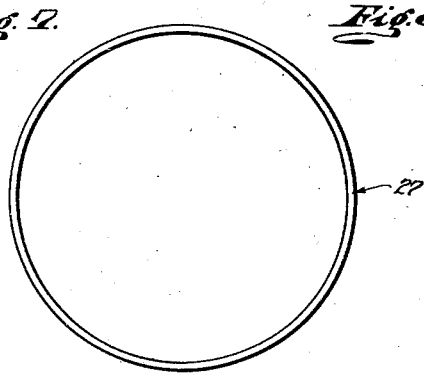
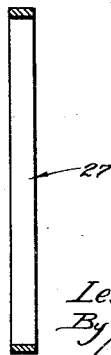
Inventor
Leland S. Hamer
By
His Attorney Patented June 5, 1934

1,961,583

UNITED STATES PATENT OFFICE 1,961,583

PACKING

Leland S. Hamer, Long Beach, Calif., assignor to Chiksan Oil Tool Company, Fullerton, Calif., a corporation of California Application November 7, 1932, Serial No. 641,544

3 Claims. (Cl. 288—1)

This invention relates to packing and it is a general object of the invention to provide a simple, practical and effective sealing means or packing.

Rubber and rubber compositions have gone into general use in packing assemblies and as a packing or sealing material. Such materials have certain characteristics that limit their practicability and effectiveness. For example, rubber packing employed to seal between swivelly connected sections of a fluid conduit or the like, is contacted by the lubricant applied to the connection and by the fluid being handled, in fact, in some cases, it is actuated or expanded by the pressure of the fluid being handled. If the lubricant or fluid be such as to react with or attack the rubber, as is frequently the case, the rubber soon becomes affected, usually swollen or saturated, so that it tends to seize or stick on the parts which it contacts. Ordinary lubricants and petroleum and its products, react with rubber causing it to grow or expand in a manner decidedly detrimental to ordinary packing and joint constructions. Ordinary rubber packing or packing parts expand through their absorption of fluids such as I have mentioned, until they bear against the surfaces that confine them with such pressures that they adhere or seize to the surfaces and thus become injured or render the joints inefficient.

It is an object of the present invention to provide a sealing means or packing involving an element adapted to be expanded to a practical working condition through the absorption of grease or fluid such as I have mentioned above.

Another object of the invention is to provide a construction in which the packing is of a definite limited size or volume relative to the space in which it is arranged and is so exposed that it has only a predetermined and limited expansion through absorption of or reaction with fluids or lubricants to which it is exposed.

It is another object of the invention to provide a packing that involves a part or element that may be expanded by the absorption of or reaction with material held by the packing or employed to lubricate the packing, and a sheath on the element for contacting or sealing with the parts to be packed, which sheath is formed of a material that will not seize or adhere to the said parts.

It is another object of the invention to provide a packing that includes a body of rubber or rubber composition and a tread or sheath of leather on the rubber adapted to form a working bearing with the packed parts.

It is another object of the invention to provide a packing device or assembly of the character mentioned that embodies a simple effective means for controlling the expansion of the expansible member. In accordance with the invention, the packing assembly includes a member operable to prevent undesirable expansion of the expansible member.

It is another object of the invention to provide a packing means or assembly of the character mentioned that is adapted for use in various situations and in connection with various classes of machinery and that is particularly effective in preventing the leakage of certain classes of fluids that have been found difficult to handle or conduct without leakage. The packing or sealing means provided by the invention is adapted to effectively seal between parts of a conduit or the like, handling petroleum or petroleum products, and is not injured or affected by such fluids.

It is another object of the invention to provide a sealing means or packing of the character mentioned that involves an improved and effective combination of simple and inexpensive parts.

Other objects and features of the invention will be best and fully understood from the following detailed description of a typical form and application of the invention, throughout which description reference is had to the accompanying drawings, in which:

Fig. 1 is a side elevation of a swivel connection or joint embodying the packing means provided by the invention. Fig. 2 is an enlarged horizontal detailed sectional view of a portion of the joint, being a view taken as indicated by line 2—2 on Fig. 1. Fig. 3 is a side elevation of the sheath included in the preferred form of packing. Fig. 4 is a transverse or diametric sectional view of the sheath. Fig. 5 is a side elevation of the expansible element of the packing. Fig. 6 is a transverse or diametric sectional view of the expansible element. Fig. 7 is a side elevation of the substantially rigid ring or member included in the packing assembly, and Fig. 8 is a transverse sectional view of the member illustrated in Fig. 7.

The present invention is capable of embodiment in forms for use in various situations and in combination with various parts and mechanisms. In order to facilitate an understanding of the invention, I will proceed with a detailed description of a more or less typical embodiment and application of the invention, it being understood that the invention is not to be taken as restricted to the specific form or application about to be described, but is to be taken as including any features or modifications that may fall within the scope of the claims.

Figs. 1 and 2 of the drawings illustrate a swivel joint or connection adapted for use in a conduit and embodying a preferred form of sealing means or packing provided by the invention. The joint illustrated in the drawings includes two longitudinally curved central sections A and two end sections B. The end sections B are adapted to be attached to the ends of lengths of tubing T. The sections A and B of the joint are tubular, and are connected together for relative rotation by rotatable connections designated generally by the character C.

As the several rotatable connections C connecting the adjacent ends of the sections A and B of the joint may be alike, I will proceed with a description of one of the connections C, it being understood that such description may apply to each of the several connections.

Each connection C for rotatably connecting the adjacent sections of the swivel joint includes a female element or socket 10 in one section and a male element or projecting part 11 on the other section rotatably fitting the socket. In the particular case illustrated in detail in Fig. 2 of the drawings, the socket 10 is provided in the outer end of one of the central sections A and the part 11 is provided on the end of one of the end sections B. The part 11 is of less diameter than the remainder of the section B, providing an inwardly facing shoulder 12. Registering grooves 13 are provided in the exterior of the part 11 and the wall of the socket 10. The grooves 13 are substantially semi-circular in cross section and carry a plurality of series or balls 14. The balls 14 cooperate with the grooves 13 to connect the sections A and B for relative rotation and prevent relative longitudinal movement between the sections.

In assembling the connection the balls 14 are introduced into the grooves 13 through a radial opening 15 in the section A. The opening 15 is closed by a screw-threaded plug 16 removably locked in position by a key 17. Grease or a suitable lubricant may be introduced in the opening 15 when the balls 14 are assembled in grooves 13 to provide for the proper and continuous lubrication of the connection, and to aid the operation of the packing means, as will be more fully described. A packing ring 18 of leather, felt, rubber, or the like, is provided between the shoulder 12 of the section B and an opposing shoulder 19 of the section A. The packing 18 operates to prevent the entrance of foreign material between the sections A and B, and prevents the leakage of lubricant from the connection. In the particular application of the invention disclosed in the drawings, the sealing means or packing provided by the invention is arranged between the inner end of the part 11 of the section B and the bottom of the socket 10 to prevent the leakage of fluid from the passage 20 of the joint.

The inner end of the part 11 and the bottom wall of the socket 10 are shaped to provide an opening or channel for holding the packing means. The end of the part 11 may engage the bottom wall of the socket 10 adjacent the periphery or exterior of the part 11 and may have suitable clearance with the bottom wall of the socket adjacent the passage 20 as indicated at 21 in Fig. 2 of the drawings. Like registering grooves 22 are provided in the inner end of the part 11 and the bottom wall of the socket 10 to form an annular opening for carrying the packing. The outer portions 23 of the walls of the grooves 22 are tapered or bevelled to converge outwardly as illustrated in the drawings, while the inner wall portions of the grooves 22 may be suitably shaped, for example, they may be rounded or concaved as illustrated. The series of balls 14 fitting or cooperating with the grooves 13 operate to hold the sections A and B against relative longitudinal movement, so that the annular opening provided by the grooves 22 remains uniform in size and shape.

The preferred form of sealing means or packing provided by the invention includes, generally, an expansible element 25, a sheath 26 for the element 25, and a substantially rigid or unyielding member 27 that controls the expansion of the element 25.

In accordance with the invention, the element 25 of the packing is formed of a material that is expansible through its absorption of or reaction with a fluid or a semi-fluid such as may be employed as a lubricant or may be handled by the conduit. Rubber or a suitable rubber composition has been found as an effective material for the element 25. In the application of the invention illustrated where the packing means is provided to seal between two tubular sections A and B, the expansible element 25 is annular or in the form of a ring. The element 25 is preferably continuous or integral. In accordance with the invention, the size or volume of the expansible sealing member 28 as initially formed bears a definite relation to the size of the opening formed by the grooves 22. As initially formed, the expansible element 25 is adapted to fit the opening formed by the grooves 22 with suitable freedom or clearance. The element 25 is provided at its outer part with flat outwardly converging annular faces 28. A cylindric face 29 may join the peripheral edges of the converging faces 28. When the packing assembly is arranged in the registering grooves 22 the faces 28 are substantially parallel with the converging walls 23 of the grooves. The opposite ends 30 of the expansible element 25 may be formed or shaped as desired or found practical to give the desired packing action and to the desired initial clearance when the packing is first put into place. In the form illustrated, the ends 30 are curved inwardly as clearly illustrated in Fig. 6 of the drawings. The inner wall or interior of the annular expansible element 25 is shaped to receive or cooperate with the expansion controlling member 27. In the embodiment of the invention illustrated in the drawings, the interior of the annular member 25 is concaved or provided with a continuous groove 31. As initially formed, the groove 31 in the inner wall of the element 25 is somewhat larger than the expansion controlling member 27 so that there is room for some expansion of the member 25 after the packing is in place.

The sheath 26 is provided to cover or be applied over the outer portion of the expansible elements 25 and to engage or fit the faces or parts to be sealed with. The sheath 26 is provided primarily to form a bearing surface on the packing and acts to prevent sticking or adhesion of the packing means to the surfaces of the parts to be sealed with. The sheath is formed of a material that presents smooth anti-friction surfaces. The sheath 26 is preferably formed of leather or a material having the characteristics of leather. In the embodiment of the invention being described, the sheath 26 is annular and covers or encases the outer portions of the expansible element 25. In accordance with the invention the sheath 26 is shaped to effectively seat on or fit over the outer faces of the element 25 and in the form of the invention illustrated in the drawings, is substantially V shaped in cross sectional configuration, having a V shaped internal groove 33 for receiving the peripheral portion of the element 25, and having outwardly converging outer surfaces 34, provided to cooperate or seal with the converging walls 23 of the registering grooves 22. The outer side or periphery of the sheath 26 is smooth or finished so that the faces 34 have effective sliding or rotative engagement with the converging wall portions 23 of the grooves 22. It is a feature of the invention that the sheath 26 is a continuous or unbroken annular member as illustrated in Fig. 3 of the drawings. The sheath 26 may be formed of an annular piece of leather, or the like, shaped or formed to be V shape in cross section.

The member 27 is provided to control the expansion of the expansible element 25 by preventing the expansion of the element 25 inwardly to enter the opening 21. The member 27 also operates to protect the interior or side of the expansible element 25 from excessive contact with fluid being handled by the conduit. The expansion controlling member 27 is in the nature of a substantially rigid or unyielding ring that is arranged in the groove 31. The member 27 may be formed of a suitable metal and may be shorter or of less width than the groove 31. In the particular case illustrated in the drawings, the member 27 is cylindrical and has flat normal ends. The member 27 is preferably of sufficient diameter to have slight clearance with the inner wall portions of the grooves 22 when the packing is assembled or operating in the grooves.

When the rotatable connection C is assembled, the three parts 25, 26 and 27 of the packing means are properly assembled prior to their arrangement in the grooves 22, the sheath being arranged on the outer part or periphery of the expansible element 25 and the member 27 being arranged in the groove 31. The assembly formed by the element 25, the sheath 26 and the ring 27 is given a thorough application of grease or like lubricant and the grease or lubricant is applied to the registering grooves 22. The assembled packing means is then positioned in the registering grooves 22 as the sections A and B are arranged together and the balls 14 introduced into the grooves 13 through the opening 15. A suitable lubricant may be introduced through the opening 15. The plug 16 is then threaded into the opening 15 and locked by the key 17. The joint or connection is then ready for use.

The element 25, in being formed of rubber, quickly absorbs a certain amount of fluid or of the lubricant to which it is exposed. The absorption of the fluid or lubricant causes expansion of the element 25. The element 25 in expanding, forces the sheath 26 outwardly into effective bearing and sealing engagement with the surfaces 24 and continuously maintains such engagement. The element 25 in expanding, has a tendency to expand in all directions and the ring or member 27 prevents the element from expanding inwardly between the sections A and B at the point of clearance 21. The parts 30 expand into pressure and sealing engagement with the walls of the grooves 22 and prevent leakage through the joints. It has been found desirable to relate the groove 31 and the member 27 to allow for a certain amount of inward expansion of the element 25. The member 27 in addition to preventing undesirable expansion of the element 25 protects the element from the action of the fluid being handled in the conduit, and lends rigidity to the packing assembly. The expansible element 25 is limited by the sheath 26 and ring 27 so that only the desired pressures and packing action is obtained. I have found that a packing designed and proportioned as shown in the accompanying drawings is particularly effective and practical for use with an ordinary lubricant and in packing against leakage of petroleum or petroleum products. With this construction the sheath 26 and parts 30 of the rubber body are maintained in suitable pressure engagement with the surfaces to be sealed. As the pressures on the sheath 26 are not excessive and the outer surfaces of the sheath are smooth or finished, there is little or no tendency for the sheath 26 to stick or adhere to the surfaces 23. The rubber parts 30 engage the surfaces to be sealed with sufficient pressure to prevent leakage of the fluid being handled.

The packing means provided by the invention, in operating as just described, does not in any way interfere with the relative rotation between the sealed parts. The packing is not affected by the fluid being handled by the conduit as the expansible member is effectively protected by the member 27 and the sheath 26. As the connection is completely sealed or closed, the lubricant is maintained in the connection to keep the element 25 properly expanded that the proper pressure is maintained on the parts 30 and the sheath 26. The packing assembly is particularly simple in construction, and is easily assembled and installed. As the expansible rubber member 25 cannot come into contact with the converging surfaces 23, it has little or no tendency to seize or adhere to the surrounding parts, and therefore is not injured by relative movement or turning between the parts A and B. The packing provided by the present invention overcomes the undesirable features or characteristics present in the usual forms of packing devices and is effective and long wearing.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. Packing for sealing between two relatively movable parts having an annular opening between them, the opening having outwardly converging wall portions, said packing including a body of rubber in the opening having outwardly converging faces on the periphery, the interior of the body having an annular groove, a leather sheath on the periphery of the body for sealing with the said wall portions of the opening, and a rigid annular member in the groove in the interior of the body.

2. Packing for sealing between two relatively moving parts of a rotary joint of a conduit which parts have an annular cavity between them comprising, a body of rubber in the cavity, a wear resisting bearing sheath enveloping a substantial portion of the rubber to have bearing engagement with both of said parts, and a substantially rigid ring protecting and confining a portion of the rubber, there being a limited sealing portion of the rubber left by the sheath and ring to be engaged by the material handled by the conduit.

3. Packing for sealing between two relatively moving parts of a rotary joint of a conduit which parts have an annular cavity between them comprising, a body of rubber in the cavity, a wear resisting bearing sheath enveloping a substantial portion of the rubber to have bearing engagement with both of said parts, and a substantially rigid ring protecting and confining a portion of the rubber, there being a limited sealing portion of the rubber exposed between each end of the ring and the sheath.

LELAND S. HAMER.